United States Patent [19]

Noda et al.

[11] Patent Number: 5,425,079

[45] Date of Patent: Jun. 13, 1995

[54] TELEPHONE POWER INTERRUPTION DATA BACKUP APPARATUS

[75] Inventors: Mitsuhiko Noda; Shozo Miyagawa, both of Kyoto, Japan

[73] Assignee: Rohm, Co., Ltd., Kyoto, Japan

[21] Appl. No.: 931,966

[22] Filed: Aug. 19, 1992

[30] Foreign Application Priority Data

Aug. 22, 1991 [JP] Japan .................................. 3-210611

[51] Int. Cl.⁶ .............................................. H04M 1/00
[52] U.S. Cl. ............................................ 379/68; 379/67; 379/355; 379/356; 379/413; 365/229; 369/15; 360/32
[58] Field of Search ...................... 379/67, 68, 88, 354, 379/355, 356, 413; 365/228, 229; 369/15; 395/750

[56] References Cited

U.S. PATENT DOCUMENTS

| | | |
|---|---|---|
| 4,458,307 | 7/1984 | McAnlis et al. ..................... 365/228 |
| 4,935,956 | 6/1990 | Hellwarth et al. ................... 379/199 |
| 5,182,769 | 1/1993 | Yamaguchi et al. ................ 379/355 |

*Primary Examiner*—James L. Dwyer
*Assistant Examiner*—Fan Tsang
*Attorney, Agent, or Firm*—Oliff & Berridge

[57] ABSTRACT

A data backup apparatus for temporarily storing the data stored in a volatile memory using an internal battery when the main power is stopped. When the operation of the internal battery is started, the data stored in the volatile memory as a digital signal is converted into an analog signal by a D/A converter, and then it is stored in a magnetic storage unit. When the power supply is restored, the data stored in the magnetic storage unit as the analog signal is read out and converted into the digital signal, and then it is restored to the volatile memory.

8 Claims, 1 Drawing Sheet

TELEPHONE POWER INTERRUPTION DATA BACKUP APPARATUS

BACKGROUND OF THE INVENTION

1. Field of the Invention

The present invention relates to a data backup apparatus and, more particularly, to a data backup apparatus for holding stored data using an internal battery when the main power is stopped.

2. Description of the Related Art

With the recent development of IC fabrication techniques, ICs have come into frequent use for household electric appliances as well as electric appliances for business use. In many electric appliances, the user can store his own data in an IC memory to utilize various facilities. For example, a volatile memory which is provided in a facsimile machine or a system telephone equipped with an answering machine (hereinunder referred to as "answer phone") can store the data exclusively for the user such as abbreviated dialing codes, an identification number and an answering message. The abbreviated dialing code is composed of about 3 digits as which a frequently used phone number is registered, and it is possible to call up the registered phone number merely by pressing the keys for the abbreviated dialing code. The identification number is a password identifying the user when the user operates the answer phone from an external telephone through a telephone line. The answering message is a message conveyed when the answering machine is operated.

In this way, by storing the data exclusively for the user into a volatile memory by the user, it is possible to simplify the operations of mechanisms which are frequently used or to automatically operate the machine from an external machine.

Volatile memory generally has a simpler structure than a nonvolatile memory, so that a volatile memory enables low cost production and a reduction in size. In addition, since a volatile memory allows partial reloading and is easy to operate, it is effectively utilized for an apparatus in which change or addition of the stored contents is frequent.

Such a volatile memory is operated and the data stored therein is held by the main power which is used for driving an entire facsimile machine or an answer phone equipped with the volatile memory. When the supply of the main power is stopped such as when power stoppage happens or when the attachment plug is pulled out, the internal battery provided in the facsimile machine or the answer phone temporarily supplies power as the backup power source so as to drive the facsimile machine or the answer phone and to hold the data stored in the volatile memory.

Long term backup, however, is impossible using a conventional internal backup battery, when the performance thereof is considered on a cost/performance basis.

In other words, a conventional internal backup battery cannot continue to supply power when the main power is stopped for a long time and the internal battery dies. When the facsimile machine or the answer phone is so frequently operated during the operation of the internal battery that the internal battery dies, it is also impossible to continue to supply power. In such cases, it is sometimes impossible to supply power necessary to maintain the backup of the data of the volatile memory which stores important information. As a result, all the important information stored in the volatile memory is lost. Consequently, even after the supply of the main power is restored, the telephone numbers registered as the abbreviated dialing codes are lost, thereby making it impossible to use the abbreviated dialing function. The identification number is also lost, thereby making it impossible to use the remote controlling function, and the answering message of the answer phone is lost, thereby making it impossible to use the function of the answering machine. The troublesome operations of restoring the abbreviated dialing codes, the identification number and the answering message are therefore necessary after the supply of the main power is restored.

SUMMARY OF THE INVENTION

Accordingly, it is an object of the present invention to eliminate the above-described problems in the prior art and to provide a data backup apparatus which is capable of maintaining the data even if the power supply necessary for backing up the data of the volatile memory is not available. Power supply may not be available when the internal battery dies due to a long term stoppage of the main power or the frequent operation of a facsimile machine or an answer phone during the operation of the internal battery. Accordingly, a data backup apparatus of the present invention is capable of using the same data as the data stored in the volatile memory before the stoppage of power supply when the supply of the main power is restored.

To achieve this aim, the present invention provides a data backup apparatus for backing up the data stored in a memory using an internal battery when the main power is stopped, the apparatus comprising: a volatile memory for storing data; the internal battery for supplying power to the apparatus for a predetermined time when the main power is stopped; a power stoppage detector for detecting a stoppage of the main power and outputting a power stoppage detection signal, and detecting an end of the stoppage of the main power and outputting a power stoppage end detection signal; a magnetic storage unit for temporarily storing the data of the volatile memory; a D/A converter for converting a digital signal stored in the volatile memory into an analog signal; an A/D converter for converting an analog signal stored in the magnetic storage unit into a digital signal; and a CPU for controlling the data backup apparatus which performs to convert the data stored in the volatile memory as a digital signal into an analog signal by the D/A converter and to store the analog signal in the magnetic storage unit when the power stoppage detection signal is supplied from the power stoppage detector, and also to convert the data stored in the magnetic storage unit as an analog signal into a digital signal by the A/D converter and to store the digital signal in the volatile memory when the power stoppage end detection signal is supplied from the power stoppage detector.

The present invention also provides a data backup apparatus attached to a system telephone apparatus or an answer phone, wherein the magnetic storage unit is a magnetic tape storage unit, the volatile memory is a memory for storing abbreviated dialing codes, an identification number and an answering message, the D/A converter, which converts a digital signal stored in the volatile memory into an analog signal so as to store the analog signal in the magnetic storage unit when a power stoppage is detected by the power stoppage detector, is a DTMF generator. The A/D converter, which converts an analog signal stored in the magnetic storage unit into a digital signal so as to restore the digital signal to the volatile memory when the end of the power stoppage is detected by the power stoppage detector, is a DTMF receiver.

According to the data backup apparatus of the present invention, when the internal battery is operated due to a stoppage of the main power, the contents of the volatile memory as digital signals are immediately converted into analog signals by the D/A converter and stored in the magnetic storage unit. When the supply of the main power is restored, the data as analog signals read out of the magnetic storage unit are converted into digital signals by the A/D converter and restored to the volatile memory. In this way, the same data as those stored in the volatile memory before the power stoppage are stored therein. Consequently, even if all the data of the volatile memory are lost when the main power is stopped for a long time or when the internal battery dies during prolonged operation, it is possible to use the data as if there had been no power stoppage and the data of the volatile memory had been held after the supply of the main power is restored.

The above and other objects, features and advantages of the present invention will become clear from the following description of the preferred embodiment thereof, taken in conjunction with the accompanying single drawing.

DESCRIPTION OF THE PREFERRED EMBODIMENT

Figure 1:
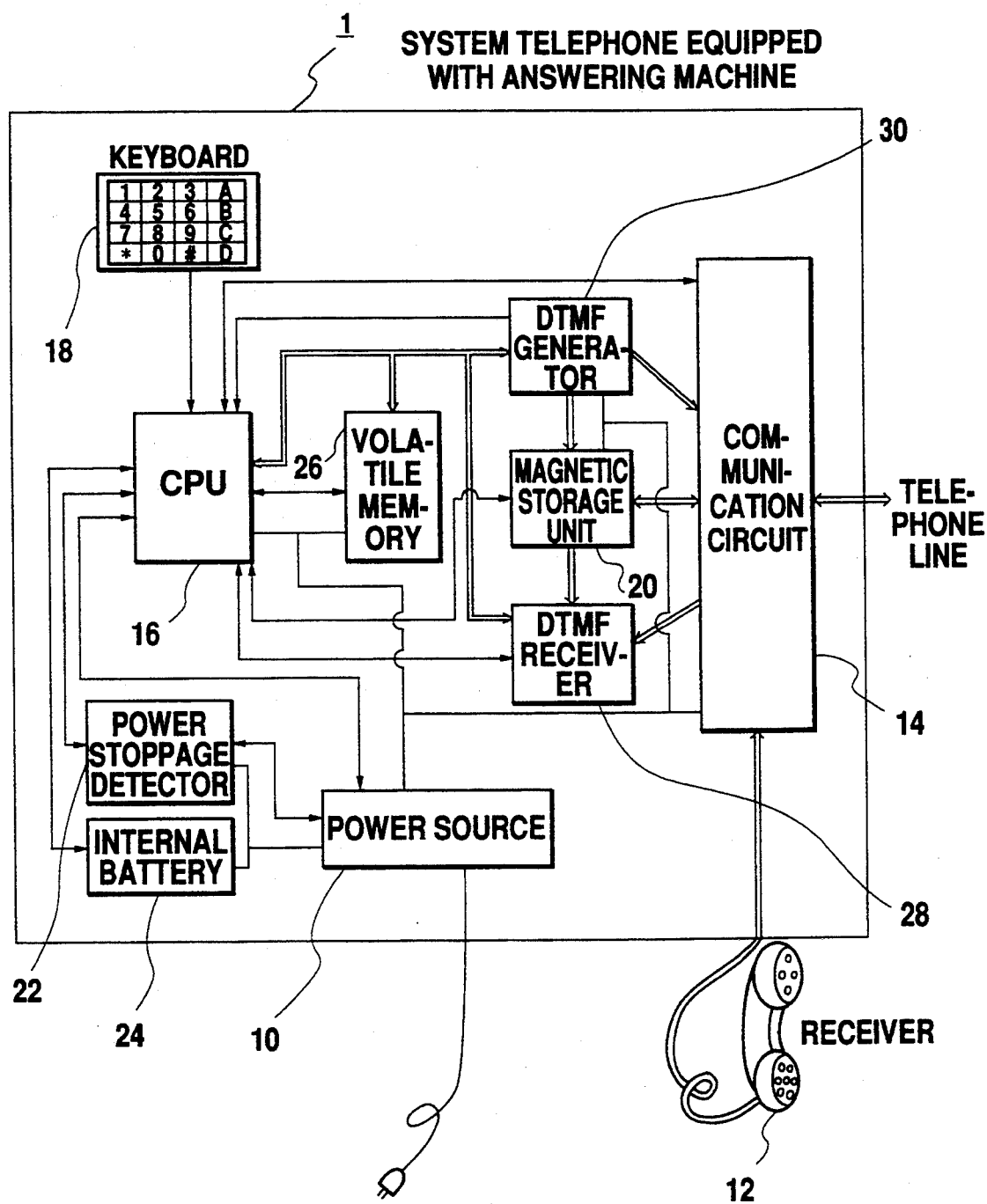
FIG. 1 is a block diagram of a system telephone equipped with an answering machine with an embodiment of a battery backup apparatus according to the present invention attached thereto.

An embodiment of the present invention will be explained hereinunder with reference to FIG. 1. FIG. 1 is a block diagram of a system telephone 1 equipped with an answering machine (hereinunder referred to as "answer phone 1") with an embodiment of a battery backup apparatus according to the present invention attached thereto.

The answer phone 1 is composed of: a power source 10 for supplying electric power necessary for operating each device; a communication circuit 14 for receiving and transmitting an analog signal from and to each device, for example, receiving an analog signal input from a telephone line and outputting the analog signal to a receiver 12 as a speech signal or converting a speech signal input from the receiver 12 into an analog signal and transmitting the analog signal to the telephone line; a CPU 16 for controlling the answer phone as a whole and the memory backup apparatus; a keyboard 18 for operating each function of the answer phone 1; and a magnetic storage unit 20 for storing and reproducing an analog signal.

A power stoppage detector 22 and an internal battery 24 are connected to the power source 10. When a stoppage of the main power is detected, the power stoppage detector 22 outputs a power stoppage detection signal to the CPU 16 and the power source 10, while when the end of the stoppage of the main power is detected, the power stoppage detector 22 outputs a power stoppage end detection signal to the CPU 16 and the power source 10. The internal battery 24 receives a command from the power source 10 and supplies electric power for temporarily driving the functions of the answer phone 1.

The answer phone 1 is also provided with a volatile memory 26, a DTMF receiver 28 and a DTMF generator 30. The volatile memory 26 stores an abbreviated dialing code of about 3 digits as which a frequently used long phone number is registered, an identification number for use when the user operates the answer phone 1 from an external phone, and an answering message for conveying when the answering machine is operated. The DTMF receiver 28 converts an analog signal into a digital signal in order to supply information to the CPU 16 or store data into the volatile memory 26. The DTMF generator 30 converts the data stored in the volatile memory 26 and the information stored in the CPU 16 in digital signals into analog signals before outputting them.

The data backup operation of the answer phone 1 in accordance with the present invention will now be explained from a stoppage of the main power till the end of the power stoppage.

When the main power is stopped, the power stoppage is detected by the power stoppage detector 22 and a power stoppage detection signal is supplied to the CPU 16 and the power source 10. When the power source 10 receives the power stoppage detection signal from the power stoppage detector 22, the power source 10 which has been supplying power to each device is changed over to the internal battery 24. When the CPU 16 receives the power stoppage detection signal from the power stoppage detector 22, the CPU 16 immediately starts the operation of moving the data stored in the volatile memory 26 to the magnetic storage unit 20. More specifically, the CPU 16 reads the data stored in the volatile memory 26 and outputs the data to the DTMF generator 30. The DTMF generator 30 converts the data which is input from the CPU 16 and also is stored in the volatile memory 26 into an analog signal and outputs the analog signal to the magnetic storage unit 20. The magnetic storage unit 20 stores the data converted into an analog signal by the DTMF generator 30 at a predetermined position on a magnetic tape. This operation is continued until all the data stored in the volatile memory 26 are recorded on the magnetic tape of the magnetic storage unit 20.

When the supply of the main power is restored during the operation of the internal battery 24, the power stoppage detector 22 first detects the supply of the main power and supplies a power stoppage end detection signal to the CPU 16 and the power source 10 in the same way as at the time of a stoppage of the main power. When the power source 10 receives the power stoppage end detection signal from the power stoppage detector 22, the internal battery 24 which has been supplying power to each device is changed over to the power source 10. When the CPU 16 receives the power stoppage end detection signal from the power stoppage detector 22, the CPU 16 immediately starts the operation of moving the data stored in the magnetic storage unit 20 to the volatile memory 26. More specifically, the CPU 16 outputs the data, which is moved from the volatile memory 26 and stored in the magnetic storage unit 20, to the DTMF receiver 28, and outputs the data to the volatile memory 26 after it is converted from the analog signal into the digital signal. The volatile memory 26 stores the data subsequently input thereto in accordance with the command from the CPU 16.

In this way, in the answer phone 1 in accordance with the present invention, the data stored in the volatile memory 26 is recorded on the magnetic tape of the magnetic storage unit 20 immediately after the operation of the internal battery 24 is started due to a stoppage of the main power. When the power supply is restored, the data read from the magnetic tape of the magnetic storage unit 20 is immediately written again back into the volatile memory 26.

Consequently, even when it is impossible to supply electric power necessary for keeping the backup of the data of the volatile memory which stores important information, for example, when the internal battery dies due to a long term stoppage of the main power or the frequent operation of the answer phone or the facsimile machine during the operation of the internal battery, and when all the important information stored in the volatile memory is lost, the same data as those stored in the volatile memory before the power stoppage are restored therein in the answer phone in this embodiment.

The DTMF generator, which is used in order to convert a digital signal into an analog signal in this embodiment, may be replaced by a general D/A converter. Similarly, the DTMF receiver, which is used in order to convert an analog signal into a digital signal in this embodiment, may be replaced by a general A/D converter.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A data backup apparatus for backing up data stored in a volatile memory using an internal battery when the main power is stopped, said apparatus comprising:
   (a) said volatile memory storing said data;
   (b) said internal battery supplying electric power to said apparatus for a predetermined time when the main power is stopped;
   (c) a power stoppage detector detecting a stoppage of the main power and outputting a power stoppage detection signal, and detecting an end of the stoppage of the main power and outputting a power stoppage end detection signal;
   (d) a magnetic storage unit storing said data of said volatile memory, the magnetic storage unit maintaining said data of said volatile memory independently of said main power and said internal battery;
   (e) a D/A converter for converting a digital signal stored in said volatile memory into an analog signal, said D/A converter being a DTMF generator and converting a digital signal stored in said volatile memory with a DTMF signal;
   (f) an A/D converter for converting an analog signal stored in the magnetic storage unit into a digital signal, said A/D converter being a DTMF receiver and converting an analog signal stored in the magnetic storage unit into a digital signal; and
   (g) a CPU for controlling said data backup apparatus to convert said data stored in said volatile memory as a digital signal into an analog signal by said D/A converter and to store said analog signal in said magnetic storage unit when said power stoppage detection signal is supplied from said power stoppage detector, and to convert said data stored in said magnetic storage unit as an analog signal into a digital signal by said A/D converter and to store said digital signal in said volatile memory when said power stoppage end detection signal is supplied from said power stoppage detector.

2. The data backup apparatus of claim 1, wherein said magnetic storage unit is a magnetic tape storage unit.

3. A system telephone equipped with a data backup apparatus for backing up data stored in a volatile memory using an internal battery when the main power is stopped, said apparatus comprising:
   (a) said volatile memory storing said data;
   (b) said internal battery supplying electric power to said apparatus for a predetermined time when the main power is stopped;
   (c) a power stoppage detector detecting a stoppage of the main power and outputting a power stoppage detection signal, and detecting an end of the stoppage of the main power and outputting a power stoppage end detection signal;
   (d) a magnetic storage unit storing said data of said volatile memory, the magnetic storage unit maintaining said data of said volatile memory independently of said main power and said internal battery;
   (e) a D/A converter for converting a digital signal stored in said volatile memory into an analog signal, said D/A converter being a DTMF generator and converting a digital signal stored in said volatile memory with a DTMF signal;
   (f) an A/D converter for converting an analog signal stored in the magnetic storage unit into a digital signal, said A/D converter being a DTMF receiver and converting an analog signal stored in the magnetic storage unit into a digital signal; and
   (g) a CPU for controlling said data backup apparatus to convert said data stored in said volatile memory as a digital signal into an analog signal by said D/A converter and to store said analog signal in said magnetic storage unit when said power stoppage detection signal is supplied from said power stoppage detector, and to convert said data stored in said magnetic storage unit as an analog signal into a digital signal by said A/D converter and to store said digital signal in said volatile memory when said power stoppage end detection signal is supplied from said power stoppage detector.

4. The system telephone of claim 3, wherein said magnetic storage unit is a magnetic tape storage unit.

5. The system telephone of claim 3, wherein said volatile memory is a memory for storing abbreviated dialing codes and an identification number.

6. An answer phone system, including a data backup apparatus for backing up the data stored in a memory using an internal battery when the main power is stopped, said answer phone comprising:
   (a) a volatile memory storing said data;
   (b) said internal battery supplying electric power to said apparatus for a predetermined time when the main power is stopped;
   (c) a power stoppage detector detecting a stoppage of the main power and outputting a power stoppage detection signal, and detecting an end of the stoppage of the main power and outputting a power stoppage end detection signal;
   (d) a magnetic storage unit storing said data of said volatile memory, the magnetic storage unit maintaining said data of said volatile memory independently of said main power and said internal battery;

(e) a D/A converter for converting a digital signal stored in said volatile memory into an analog signal, said D/A converter being a DTMF generator and converting a digital signal stored in said volatile memory with a DTMF signal;

(f) an A/D converter for converting an analog signal stored in the magnetic storage unit into a digital signal, said A/D converter being a DTMF receiver and converting an analog signal stored in the magnetic storage unit into a digital signal; and (g) a CPU for controlling said data backup apparatus to convert said data stored in said volatile memory as a digital signal into an analog signal by said D/A converter and to store said analog signal in said magnetic storage unit when said power stoppage detection signal is supplied from said power stoppage detector, and also to convert said data stored in said magnetic storage unit as an analog signal into a digital signal by said A/D converter and to store said digital signal in said volatile memory when said power stoppage end detection signal is supplied from said power stoppage detector.

7. The answer phone of claim 6, wherein said magnetic storage unit is a magnetic tape storage unit for storing a received message.

8. The answer phone of claim 6, wherein said volatile memory is a memory for storing abbreviated dialing codes, an identification number and an answering message.

* * * * *